(12) United States Patent
Oh et al.

(10) Patent No.: US 8,663,837 B2
(45) Date of Patent: Mar. 4, 2014

(54) SECONDARY BATTERY

(75) Inventors: Kyung-Su Oh, Daejeon (KR); Cha-Hun Ku, Daejeon (KR); Yong-Su Choi, Chungbuk (KR); Sung-Jong Kim, Daejeon (KR); Jung-Ah Lee, Seoul (KR); Jae-Dong Chang, Chungbuk (KR); Dong-Myung Kim, Daejeon (KR); Jun-Yong Jeong, Daejeon (KR); Sung-Min Hwang, Chungbuk (KR); Do-Gyun Kim, Chungbuk (KR); Sang-Bong Nam, Chungcheongnam-do (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/132,767

(22) PCT Filed: Mar. 11, 2011

(86) PCT No.: PCT/KR2011/001739
§ 371 (c)(1),
(2), (4) Date: Jun. 3, 2011

(87) PCT Pub. No.: WO2011/115392
PCT Pub. Date: Sep. 22, 2011

(65) Prior Publication Data
US 2012/0028090 A1  Feb. 2, 2012

(30) Foreign Application Priority Data
Mar. 17, 2010  (KR) .................. 10-2010-0023887

(51) Int. Cl.
*H01M 2/08* (2006.01)
(52) U.S. Cl.
USPC ....................................... 429/185

(58) Field of Classification Search
None
See application file for complete search history.

(56) References Cited

U.S. PATENT DOCUMENTS

| | | | |
|---|---|---|---|
| 6,468,691 B1 * | 10/2002 | Malay et al. | 429/174 |
| 2002/0098409 A1 * | 7/2002 | Oh et al. | 429/56 |
| 2003/0031919 A1 * | 2/2003 | Isozaki et al. | 429/56 |
| 2003/0157402 A1 * | 8/2003 | Hamada et al. | 429/153 |
| 2003/0180582 A1 * | 9/2003 | Masumoto et al. | 429/7 |
| 2006/0093903 A1 * | 5/2006 | Hong et al. | 429/161 |
| 2006/0093904 A1 | 5/2006 | Cheon et al. | |
| 2006/0121336 A1 * | 6/2006 | Yoon | 429/53 |

FOREIGN PATENT DOCUMENTS

| | | | |
|---|---|---|---|
| JP | 2008251464 | * | 10/2008 |
| KR | 10-2006-0037595 A | | 5/2006 |
| KR | 10-0846955 B1 | | 7/2008 |
| KR | 10-2009-0027316 A | | 3/2009 |
| KR | 10-0973423 B1 | | 8/2010 |

OTHER PUBLICATIONS

Machine Translation of JP 2008-251464 cited above.*

* cited by examiner

*Primary Examiner* — Patrick Joseph Ryan
*Assistant Examiner* — Wyatt McConnell
(74) *Attorney, Agent, or Firm* — Birch, Stewart, Kolasch & Birch, LLP

(57) ABSTRACT

A secondary battery includes an electrode assembly in which a cathode plate and an anode plate are arranged with a separator being interposed therebetween, a case in which the electrode assembly is received, a cap assembly capable of sealing an open end of the case, a gasket interposed between the case and the cap assembly, and a leakage prevention portion formed at one surface of the gasket and/or one surface of the cap assembly, which is oriented toward the electrode assembly and contacted with the gasket.

9 Claims, 4 Drawing Sheets

SECONDARY BATTERY

CROSS-REFERENCE TO RELATED APPLICATION

This application claims priority under 35 USC 119(a) to Korean Patent Application No. 10-2010-0023887 filed in Republic of Korea on Mar. 17, 2010, the entire contents of which are incorporated herein by reference.

BACKGROUND OF THE INVENTION

1. Field of the Invention

The present invention relates to a secondary battery, and more particularly to a lithium ion/polymer secondary battery.

2. Description of the Related Art

Generally, secondary batteries are rechargeable batteries, differently from primary batteries, and such secondary batteries are widely used as power sources of electric vehicles or electronic devices such as cellular phones, notebooks and camcorders. In particular, a capacity of a lithium secondary battery with an operation voltage of 3.6V is about three times or more of that of nickel-cadmium batteries or nickel-hydrogen batteries frequently used as power source of electronic devices. In addition, the lithium secondary battery has a high energy density per unit weight, so lithium secondary batteries tend to be more increasingly used.

The lithium secondary battery frequently uses lithium-based oxides and carbon materials as positive active material and negative active material, respectively. Also, the lithium secondary battery may be classified into rectangular cells, cylindrical cells and pouch-type cells.

The lithium ion secondary battery includes an electrode assembly in which a positive electrode, a separator and a negative electrode are arranged in order, and an enclosure sealing the electrode assembly together with electrolyte. In particular, an enclosure of a rectangular-type or cylindrical-type secondary battery includes a case having an open end and a cap assembly sealing the open end of the case.

The electrode assembly is classified into a jelly-roll type electrode assembly in which a separator is interposed between sheet-type positive and negative electrodes respectively coated with active materials and then rolled, and a stack-type electrode assembly in which a separator is interposed between positive and negative electrodes of a predetermined size such that they are stacked in order. Here, the jelly-roll type electrode assembly is widely used since the jelly-roll type electrode assembly is advantageous in easy production and high energy density per weight and is easily received in a cylindrical or rectangular case. Meanwhile, the stack-type electrode assembly is widely used as pouch-type batteries.

However, when a secondary battery is charged/discharged, the electrode assembly tends to be deformed through repeated expansion and shrinkage, and in this procedure, in case of the jelly-roll type electrode assembly, stress is focused on a metallic center pin, so electrodes may pierce into the separator and come into contact with the metallic center pin, which causes internal electric short circuit. Such an internal short circuit of the secondary battery makes the battery generate heat, and the heat may decompose organic solvent to generate gas, thereby increasing the pressure in the battery and rupturing the enclosure. The gas pressure in the battery may also be increased due to internal short circuit caused by an external impact.

In order to solve such a safety-related problem of a battery, the secondary battery is basically provided with a PTC element. In particular, a cylindrical secondary battery includes a cap assembly that includes safety devices such as a safety vent for discharging a high-pressure gas and a CID (Current Interrupt Device) for interrupting an electric current when an inner pressure of the battery is increased, and a top cap for forming a protruded terminal protecting such safety devices. Also, the cap assembly is sealed with the case by means of a gasket.

However, in such a conventional secondary battery, while the cap assembly is assembled with the case by means of the gasket, the possibility of creation of a gap is very high between the gasket and the cap assembly or between the gasket and the case. Such a gap deteriorates sealing of the battery. In other words, the gasket is compressed and deformed due to the case during a clamping process or the like, so the case is closely adhered to the cap assembly. However, in the gasket adopting a conventional structure, a surface closely adhered between the case and the cap assembly has a simple flat shape, so its sealing ability is not so good. In particular, if the clamping surface of the gasket is not uniformly pressed while the case is clamped, the flat surface of the gasket is deformed unevenly, so the gasket is partially not adhered to the case or the cap assembly, thereby creating a gap and thus deteriorating the sealing with the case.

In order to solve this problem, Korean Patent Publication No. 10-2006-0037595 discloses a secondary battery having at least one wrinkle with an uneven shape formed at a surface of a gasket, which is contacted with a case and a cap assembly. However, this secondary battery has an uneven structure only at the gasket made of plastic, so the deterioration of sealing of the secondary battery is still not overcome. The sealing structure of such a gasket of the conventional secondary battery is designed for sealing the interface portion between the safety vent located at a primarily exposed portion of electrolyte and/or gas, or a lowermost layer of the cap assembly, and the gasket surrounding an outer periphery of the safety vent, so the above problem occurs. In other words, in the sealing manner disclosed in the conventional document, in a state that electrolyte or the like is leaked through the interface between the safety vent and the gasket surrounding the outer periphery of the safety vent, a final end of the interface is sealed. Thus, the sealing structure between the cap assembly and the gasket according to the conventional technique has an obvious limit.

SUMMARY OF THE INVENTION

The present invention is designed to solve the problems of the prior art, and therefore it is an object of the present invention to provide a secondary battery having an improved structure such that a portion where electrolyte and/or is initially leaked, or an interface between a gasket and a cap assembly having a safety vent, is sealed in a more perfect way.

In one aspect of the present invention, there is provided a secondary battery, which includes an electrode assembly in which a cathode plate and an anode plate are arranged with a separator being interposed therebetween; a case in which the electrode assembly is received; a cap assembly capable of sealing an open end of the case; a gasket interposed between the case and the cap assembly; and a leakage prevention portion formed at one surface of the gasket and/or one surface of the cap assembly, which is oriented toward the electrode assembly and contacted with the gasket.

Preferably, the cap assembly includes a top cap configured to seal the open end of the case; a PTC (Positive Temperature Coefficient) element arranged in contact with the top cap; and a safety vent having one side contacted with the PTC element and the other side contacted with the gasket, the leakage prevention portion being formed at the other side of the safety vent, the safety vent being electrically connected to the electrode assembly.

Preferably, the leakage prevention portion includes at least one serration or protrusion formed at the surface of the cap assembly contacted with the gasket.

Preferably, the serration has a triangular, rectangular, circular or round shape.

Preferably, the protrusion has a triangular or quadrangular pyramid shape.

Preferably, the serration or protrusion further includes a barb.

Preferably, the safety vent is made of metallic material.

Preferably, the secondary battery further includes a second leakage prevention portion formed at a surface of the cap assembly, which is opposite to the leakage prevention portion and contacted with the gasket.

Preferably, the secondary battery further includes a third leakage prevention portion formed at a surface of the cap assembly, which is contacted with the gasket.

Preferably, at least one of the second leakage prevention portion and the third leakage prevention portion has at least one serration or protrusion.

Preferably, at least one of the leakage prevention portion and the third leakage prevention portion has at least one serration or protrusion.

The secondary battery according to the present invention is configured such that a serration or protrusion is provided at a portion where electrolyte or gas is initially leaked, or at one surface of at least one of a cap assembly in which a top-cap, a PTC element and a safety vent are arranged in order and a gasket contacting with the cap assembly, thereby enhancing a coupling force between the cap assembly and the gasket. In addition, since a moving length of the pass of gas or electrolyte through the portion is increased, a sealed state of the secondary battery is greatly improved though an external impact is applied thereto or though an inner pressure of the secondary battery is increased.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Figure 1:
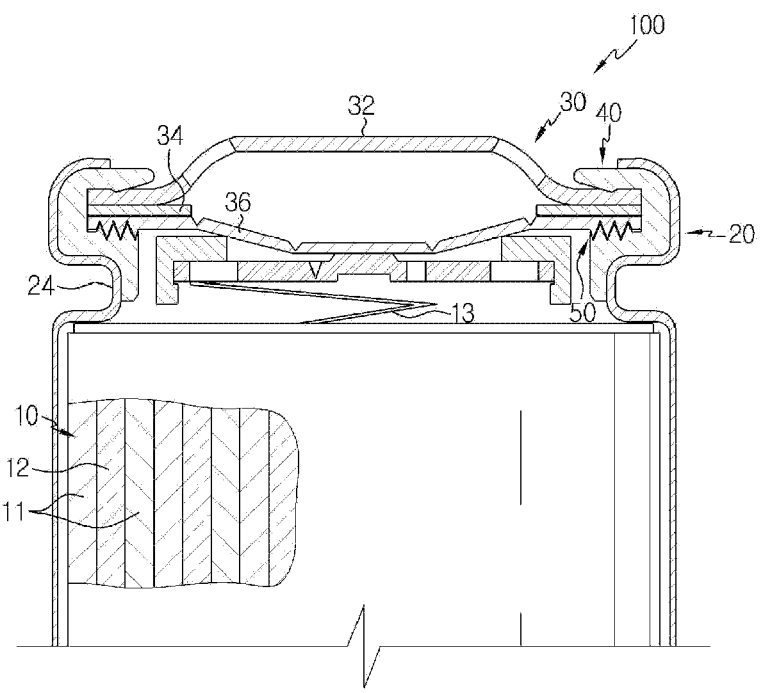
FIG. 1 is a sectional view schematically showing a secondary battery according to a preferred embodiment of the present invention.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

A secondary battery according to a preferred embodiment of the present invention includes an electrode assembly in which a cathode plate and an anode plate are arranged with a separator being interposed therebetween, a case in which the electrode assembly is received, a cap assembly capable of sealing an open end of the case, a gasket interposed between the case and the cap assembly, and a leakage prevention portion formed at one surface of the gasket and/or one surface of the cap assembly, which is oriented toward the electrode assembly and contacted with the gasket.

The cap assembly includes a top cap configured to seal the open end of the case, a PTC (Positive Temperature Coefficient) element arranged in contact with the top cap, and a safety vent having one side contacted with the PTC element and the other side contacted with the gasket, the leakage prevention portion being formed at the other side of the safety vent, the safety vent being electrically connected to the electrode assembly.

An interface portion between the cap assembly and the gasket, particularly an interface portion between the gasket and the safety vent, may easily leak electrolyte or gas, so the leakage prevention portion formed as above may prevent electrolyte or gas from being leaked at the interface until the safety vent is short-circuited, thereby greatly improving the safety of the battery.

The leakage prevention portion includes at least one serration or protrusion formed at the surface of the cap assembly, which is contacted with the gasket. Meanwhile, the leakage prevention portion having a serrated or protruded structure improves a coupling force between the cap assembly and the gasket when the cap assembly is assembled to the case of the battery via the gasket by means of a mechanical pressing process (or, a clamping process). In detail, due to the leakage prevention portion having a serrated or protruded structure, a serration or protrusion of the safety vent made of metallic material partially pierces through a surface of the gasket made of plastic, and thus a coupling force between the cap assembly and the gasket, assembled as above, is greatly enhanced.

The leakage prevention portion having a serrated or protruded structure may be formed at the surface of the cap assembly, contacted with the gasket, and/or the surface of the gasket, contacted with the cap assembly. In aspect of the coupling force, it is preferred that protrusions or serration are formed at both surfaces. The leakage prevention portion with a serrated or protruded structure has no special limit in its location, size and shape if it can enhance a coupling force between the gasket and the cap assembly. However, the leakage prevention portion having a serrated structure preferably has a triangular, rectangular, circular or round shape, and the leakage prevention portion having a protruded structure preferably has a triangular or quadrangular pyramid shape. The triangular or quadrangular pyramid-shape protrusion with a sharp tip is preferably formed at the safety vent, and such a protrusion may easily pierce through the surface of the gasket, thereby improving a coupling force, an adhering (or, fixing) property and a shape-fitting ability of the contacting interfaces. In addition, the leakage prevention portion with a protruded structure preferably has a barb, like one commonly formed at a fish hook, at a tip of the protruded structure so as to further improve a coupling force and/or an adhering property of the interface.

A secondary battery according to another embodiment of the present invention further includes a second leakage prevention portion formed at a surface of the cap assembly, which is opposite to the leakage prevention portion and contacted with the gasket. The leakage prevention portion primarily prevents electrolyte or gas from being leaked, but if the leakage preventing ability of the leakage prevention portion is insufficient, the second leakage prevention portion secondarily functions to prevent leakage of electrolyte or gas. The second leakage prevention portion has the same shape and structure as the leakage prevention portion.

A secondary battery according to still another embodiment of the present invention further includes a third leakage prevention portion formed at any one of the surface of the case, which is contacted with the gasket, and the surface of the gasket, which is contacted with the case. The third leakage prevention portion is used for preventing electrolyte or gas from being leaked through the interface between the case and the gasket, separately from the leakage prevention portion and the second leakage prevention portion explained above.

The safety vent is preferably made of metallic material. The size of the safety vent may be changed in accordance with its material and structure, and there is no special limitation if the safety vent may be ruptured to discharge gas when high pressure of a certain level is generated in the battery. In particular, the safety vent may have a thickness of about 0.2 to 0.6 mm.

Thickness of the PTC element may also be changed depending on its material or structure, and preferably 0.2 to 0.4 mm. However, if the PTC element has too great thickness, internal resistance is increased, and thus the size of the battery is also increased, which decreases the capacity of battery per unit size. If the PTC element has too small thickness on the contrary, it is difficult to intercept a current at high temperature as desired, and the PTC element may be broken even by a weak external impact. Thus, the thickness of the PTC element may be suitably determined within the above range in consideration of the above factors together.

The top cap contacted with the PTC element has no special limit in its thickness if the top cap may protect various components of the cap assembly against a pressure applied from the outside, and the thickness of the top cap is preferably 0.3 to 0.5 mm. If the top cap has too small thickness, the top cap may not easily exhibit a suitable mechanical strength. If the top cap has too great thickness on the contrary, size and weight of the battery are increased, so the capacity of battery per unit size may be decreased undesirably.

The gasket is made of elastic material with electric insulation, which is not specially limited if it has electric insulation, impact resistance, elasticity and durability. For example, the gasket may be made of polyolefin or polypropylene (PP).

Generally, in a cylindrical secondary battery, a cathode lead welded to a cathode foil of a jelly-roll type electrode assembly is electrically connected to the cap assembly and connected to a protruded terminal at the upper end of the top cap, and an anode lead welded to an anode foil is welded to a sealed end of the case such that the case itself configures an anode terminal. The material of the case is not specially limited, but the case may be made of any one of stainless steel, steel and aluminum, or their equivalents. In a state that the electrode assembly is received in the case, an electrolytic solution is injected therein, and the cap assembly is mounted to an open end of the case to seal the open end, and then the secondary battery is completely assembled.

The secondary battery according to the embodiments of the present invention may be a lithium (ion) secondary battery having high energy density, high discharge voltage and excellent power stability. The lithium secondary battery may be composed of a cathode, an anode, a separator and a nonaqueous electrolytic solution containing lithium salt. The cathode is for example made by coating a cathode current collector with a mixture of cathode active material, conductive material and binder and then drying it, and, if necessary, filler is further added thereto. The anode is made by coating an anode current collector with anode active material and then drying it, and the above components may be further included therein as necessary. The separator is interposed between the anode and the cathode and made of a thin insulating film with excellent ion transport and excellent mechanical strength. The non-aqueous electrolytic solution containing lithium salt is composed of nonaqueous electrolyte and lithium salt. The non-aqueous electrolyte is liquid nonaqueous electrolyte, solid electrolyte or inorganic solid electrolyte. Here, the current collector, the electrode active material, the conductive material, the binder, the filler, the separator, the electrolytic solution and the lithium salt are well known in the art and thus not explained in detail here.

Hereinafter, a secondary battery according to a preferred embodiment of the present invention is explained with reference to the accompanying drawings.

FIG. 1 is a sectional view schematically showing configuration of the secondary battery according to the preferred embodiment of the present invention.

Referring to FIG. 1, the secondary battery 100 of this embodiment includes a cylindrical case 20 in which an electrode assembly 10 is received together with electrolyte, a cap assembly 30 coupled to seal an open end of the case 20, a gasket 40 interposed between the case 20 and the cap assembly 30, and a leakage prevention portion 50 formed at both a surface of the cap assembly 30, which is oriented toward the electrode assembly 10, and a surface of the gasket 40, which is contacted with the surface of the cap assembly 30.

The electrode assembly 10 includes two electrode plates 11 having different polarities and having a roll-type wide plate shape, and a separator 12 interposed between the electrode plates 11 or disposed at a right or left side of any one of the electrode plates 11 so as to insulate the electrode plates 11 from each other. The electrode assembly 10 preferably has a rolled structure of a so-called 'jelly-roll' type. It is also possible that cathode and anode plates of a predetermined size are laminated with a separator being interposed between them. For making two electrode plates 11, a current collector made of a metallic foil or mesh containing aluminum and copper, respectively, is coated with active material slurry. The slurry is generally obtained by stirring granular active material, auxiliary conductor, binder and plasticizer, which are added to a solvent. The solvent is removed in a following process. The electrode plate 11 preferably has non-coating portions that are not coated with the slurry, at an initiating end and a finishing end of the current collector in a direction that the electrode plate 11 is rolled. A pair of leads corresponding to the electrode plates 11 respectively are attached to the non-coating portions. A first lead 13 attached to an upper end of the electrode assembly 10 is electrically connected to the cap assembly 30, and a second lead (not shown) attached to a lower end of the electrode assembly 10 is connected to a bottom of the case 20. It is also possible that both of the first lead 13 and the second lead are drawn toward the cap assembly 30.

The electrode assembly 10 is disposed on a first insulation plate (not shown) installed at the bottom of the case 20, and a second insulation plate 14 is preferably disposed at an upper end of the electrode assembly 10. The first insulation plate insulates the electrode assembly 10 from the bottom of the case 20, and the second insulation plate 14 insulates the electrode assembly 10 from the cap assembly 30.

The case 20 is made of light conductive metallic material such as aluminum or aluminum alloys, and the case 20 has a cylindrical structure having an open portion at its upper end and a closed bottom opposite thereto. The electrode assembly 10 and an electrolytic solution (not shown) are received in an inner space of the case 20. The electrolytic solution is used for transferring lithium ions generated by electric and chemical reactions of the electrode plates 11 when the secondary battery 100 is charged/discharged. The electrolytic solution may be a nonaqueous organic electrolyte that is a mixture of lithium salt and organic solvent, or a polymer using polymer electrolyte, but the kind of electrolyte is not specially limited.

Meanwhile, a metallic center pin (not shown) may be inserted at a center of the case 20 so as to prevent the electrode assembly 10 rolled into a jelly-roll type from being released and to play a role of gas passage in the secondary battery 100. An upper portion of the case 20 above the electrode assembly 10 is bent inwards by pressure to form a beading portion 24 for preventing vertical movement of the electrode assembly 10.

The cap assembly 30 is assembled to the open end of the case 20 in a state that the cap assembly 30 is sealed by means of the gasket 40. The cap assembly 30 includes a top cap 32, a PTC element 34, a safety vent 36 and a CID (Current Interrupt Device) 38. The top cap 32 has an electrode terminal (not shown) formed for electric connection with an external device. The PTC element 34 is used for intercepting flow of current in the battery when the battery 100 is overheated. The safety vent 36 is protruded convexly at its center and welded to the CID 38. The CID 38 may be deformed together with the safety vent 36 due to the inner pressure of the secondary battery 100, and the CID 38 may be classified into CID gasket and CID filter.

The gasket 40 generally has a cylindrical shape with both ends opened, and one end of the gasket 40 is preferably bent at a right angle toward the center such that the one end is located at an open portion of the case 20, or a clamping portion. The other end of the gasket 40 is spread straightly at an initial assembling stage toward an axial direction of the cylindrical gasket 40, and the other end of the gasket 40 is bent at a right angle toward the center during a pressing process such that inner and outer peripheries of the gasket 40 are respectively closely adhered to the top cap of the cap assembly 30 and the inner side of the case 20. The gasket 40 is made of material having electric insulation, impact resistance, elasticity and durability, for example polyolefin or polypropylene (PP).

The leakage prevention portion 50 is formed at the lower surface of the safety vent 36 and the surface of the gasket 40, which is contacted with the safety vent 36, and the leakage prevention portion 50 has a serrated structure whose side is triangular. In other words, the serration prepared at the safety vent 36 and the serration prepared at the gasket 40 are engaged with and closely adhered to each other when the open end of the case 20 is clamped, thereby further enhancing a sealing and coupling force between the cap assembly 30 and the gasket 40. Thus, the leakage prevention portion 50 prevents electrolyte or gas from being leaked above the cap assembly 30 until the safety vent 36 is ruptured, in case an inner pressure of the secondary battery is increased.

Figure 2:
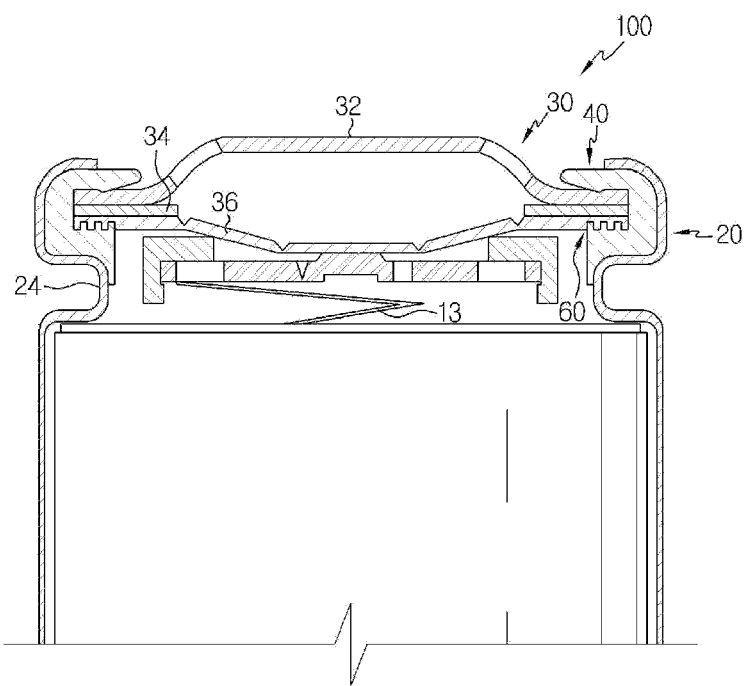
FIG. 2 is a sectional view showing a cap assembly of a secondary battery according to another embodiment of the present invention.

FIG. 2 is a sectional view showing a cap assembly of a secondary battery according to another embodiment of the present invention. The same reference symbol as in FIG. 1 designates the same component with the same function.

Referring to FIG. 2, the secondary battery 100 of this embodiment has a leakage prevention portion 60 having a rectangular shape. The leakage prevention portion 60 has a rectangular serrated structure formed at contact portions between the safety vent 36 and the gasket 40. The leakage prevention portion 60 increases a moving distance of electrolyte or gas rather than the above leakage prevention portion 50, thereby greatly improving a sealing of the interface though an external impact or inner pressure is increased.

Figure 3:
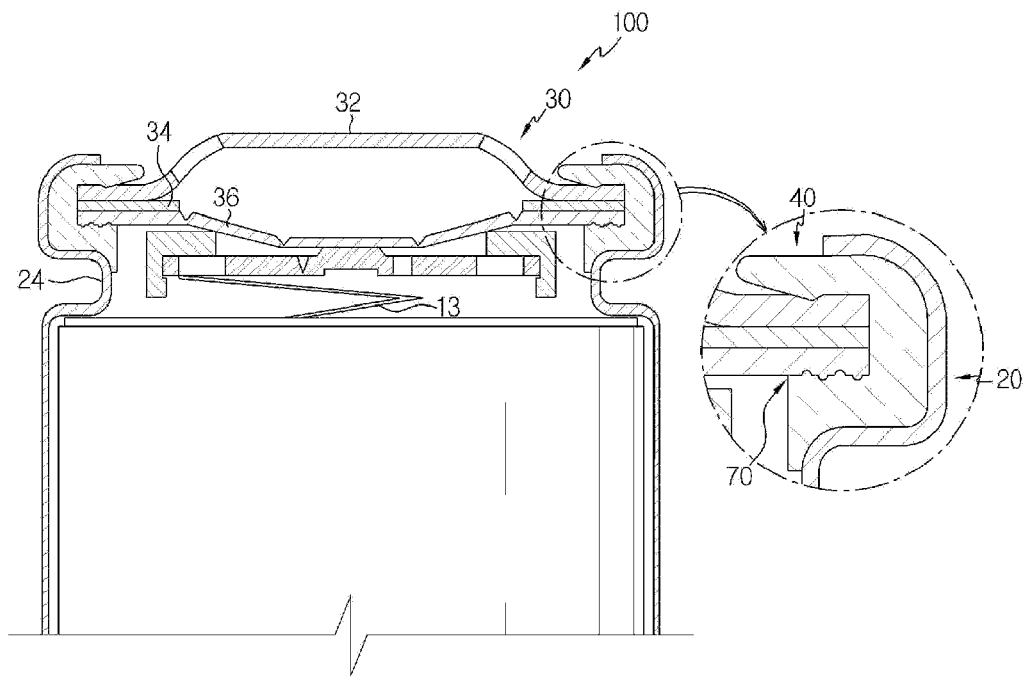
FIG. 3 is a sectional view showing a cap assembly of a secondary battery according to still another embodiment of the present invention.
Figure 4:
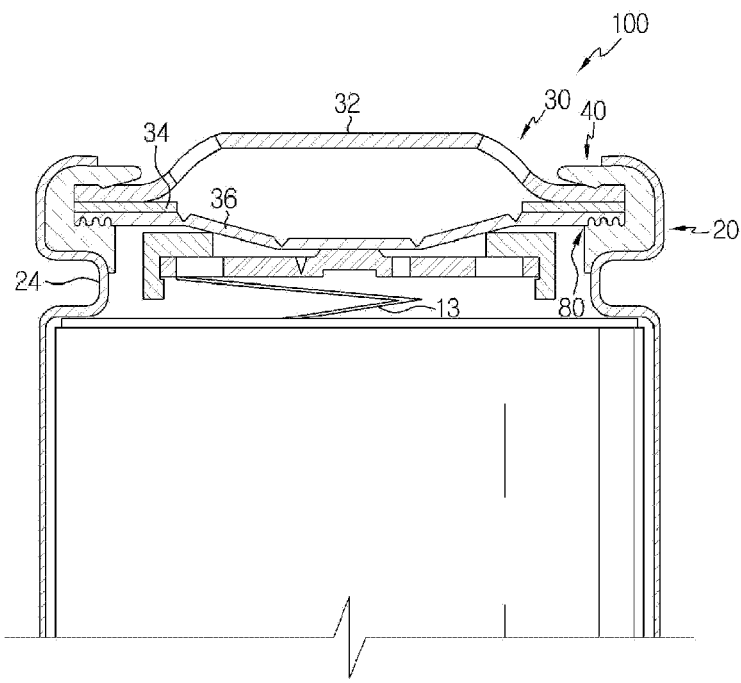
FIG. 4 is a sectional view showing a cap assembly of a secondary battery according to further another embodiment of the present invention.

FIGS. 3 and 4 are sectional views showing secondary batteries according to other embodiments of the present invention. The same reference symbol as in FIGS. 1 and 2 designates the same component with the same function.

Referring to FIGS. 3 and 4, the secondary battery of these embodiments includes a circular leakage prevention portion 70 or a round leakage prevention portion 80. The leakage prevention portion 70 shown in FIG. 3 is prepared at an interface where the safety vent 36 and the gasket 40 contact each other, and semicircular convex and concave parts are successively formed at the leakage prevention portion 70, and the convex and concave parts at the interface are respectively engaged with corresponding concave and convex parts. The leakage prevention portion 80 shown in FIG. 4 is prepared at an interface where the safety vent 36 and the gasket 40 contact each other, and round convex and concave parts are successively formed at the leakage prevention portion 80, and the convex and concave parts at the interface are respectively engaged with corresponding concave and convex parts.

Figure 5:
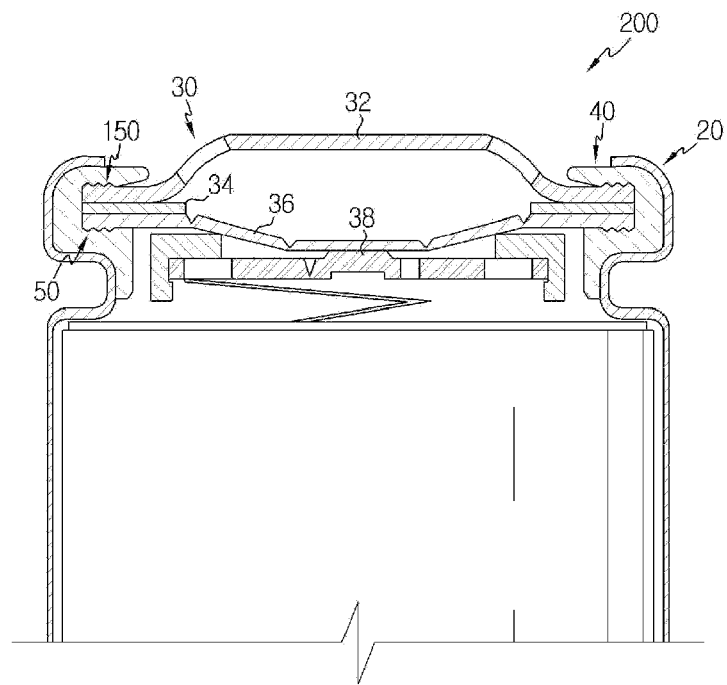
FIG. 5 is a sectional view showing a cap assembly of a secondary battery according to still another embodiment of the present invention.

FIG. 5 is a sectional view showing a cap assembly of a secondary battery according to another embodiment of the present invention. The same reference symbol as in FIGS. 1 to 4 designates the same component with the same function.

Referring to FIG. 5, the secondary battery 200 of this embodiment further includes a second leakage prevention portion 150 in addition the aforementioned leakage prevention portion 50.

The second leakage prevention portion 150 has a protruded structure prepared at an upper surface of the top cap 32. This protruded structure may have a triangular or quadrangular pyramid shape. The protruded region of the second leakage prevention portion 150 pierces into the surface of the gasket 40 and is coupled with the gasket 40 when the case 20 and the cap assembly 30 are clamped, thereby increasing a coupling force and a sealing property between the gasket 40 and the top cap 32. The protruded structure of the second leakage prevention portion 150 may be deformed, and in this case, a serration may be formed at a corresponding surface of the gasket 40.

Figure 6:
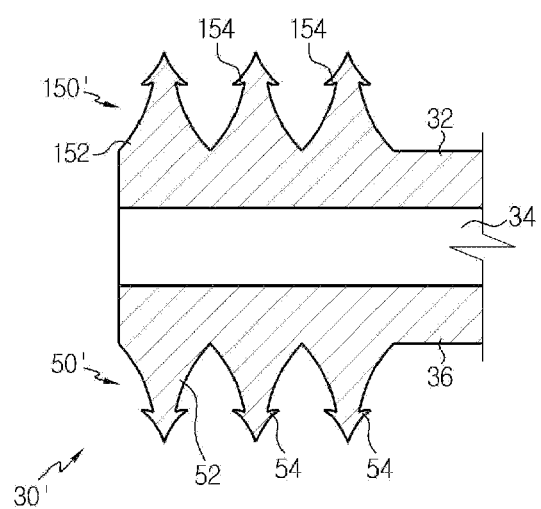
FIG. 6 is a sectional view schematically showing a modification of the cap assembly of FIG. 5.

FIG. 6 is a sectional view schematically showing a modification of the cap assembly shown in FIG. 5. The same reference symbol as in FIGS. 1 to 5 designates the same component with the same function.

Referring to FIG. 6, a cap assembly 30' of the secondary battery 200 according to this embodiment includes a leakage prevention portion 50' formed at a lower surface of the safety vent 36 and having a protruded shape, and a second leakage prevention portion 150' formed at an upper surface of the top cap 32 and having a protruded shape, wherein protrusions 52, 152 of the leakage prevention portions 50', 150' further include barbs 54, 154 formed at their tips, respectively. Such barbs 54, 154 are more firmly secured to the gasket 40 when the protrusions 52, 152 pierces into the gasket 40 while the gasket 40 and the cap assembly 30 are coupled by means of the case 20 during the clamping process, thereby enhancing a coupling force and a sealing force.

Figure 7:
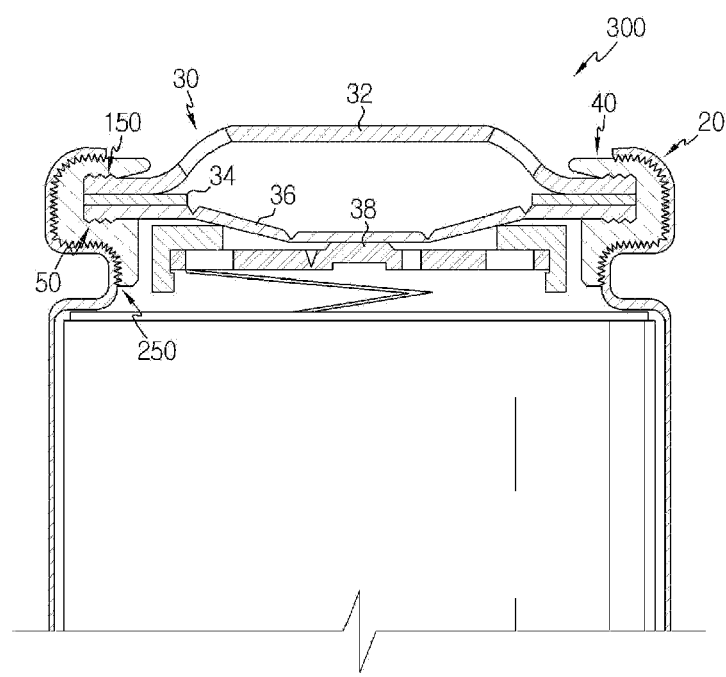
FIG. 7 is a sectional view showing a cap assembly of a secondary battery according to further another embodiment of the present invention.

FIG. 7 is a sectional view schematically showing a cap assembly of a secondary battery according to another embodiment to the present invention. The same reference symbol as in FIGS. 1 to 6 designates the same component with the same function.

The secondary battery 300 of this embodiment further includes a third leakage prevention portion 250 in addition to the aforementioned leakage prevention portion 50 and the second leakage prevention portion 150.

The third leakage prevention portion 250 has a protruded or serrated structure formed at an inner side of the case 20, which is contacted with the gasket 40. As a modification, a serration or protrusion may also be prepared at a surface of the gasket 40 in correspondence with the protruded or serrated structure of the case 20. The third leakage prevention portion 250 is used for preventing electrolyte or gas from being discharged through a portion other than the interface between the gasket 40 and the cap assembly 30, or through an inner side of the case 20, due to an external impact or inner pressure in the battery.

Free Fall Experiment

Ten (10) samples of the secondary battery (a comparative example 1) having a serration only at the gasket were prepared, and 20 samples of the secondary battery (an experimental example 1) having serrations at both the gasket and the safety vent were prepared. The samples had fallen from a 1 m height to a concrete bottom 10 times, respectively. After the experiment, it was found that electrolyte was leaked from the samples of the comparative example at 2.1 free falls on average, and that electrolyte was not leaked from 20 samples of the experimental example 1 even at 10 free falls.

Results of the experiment are depicted in the following table 1.

TABLE 1

|  | Sample No. | Drop 1 | Drop 2 | Drop 3 | Drop 4 | Drop 5 | Drop 6 | Drop 7 | Drop 8 | Drop 9 | Drop 10 |
|---|---|---|---|---|---|---|---|---|---|---|---|
| Comparative Example 1 Unevenness is formed only at the gasket | 1 | ■ |  |  |  |  |  |  |  |  |  |
|  | 2 | ■ |  |  |  |  |  |  |  |  |  |
|  | 3 |  | ■ |  |  |  |  |  |  |  |  |
|  | 4 |  | ■ |  |  |  |  |  |  |  |  |
|  | 5 |  |  | ▨ |  |  |  |  |  |  |  |
|  | 6 | ▨ |  |  |  |  |  |  |  |  |  |
|  | 7 | ▨ |  |  |  |  |  |  |  |  |  |
|  | 8 |  | ▨ |  |  |  |  |  |  |  |  |
|  | 9 |  |  | ▨ |  |  |  |  |  |  |  |
|  | 10 |  |  |  |  | ▨ |  |  |  |  |  |
| Experimental Example 1 Unevenness is formed at both the gasket and the safety belt | 1 |  |  |  |  |  |  |  |  |  |  |
|  | 2 |  |  |  |  |  |  |  |  |  |  |  |
|  | 3 |  |  |  |  |  |  |  |  |  |  |  |
|  | 4 |  |  |  |  |  |  |  |  |  |  |  |
|  | 5 |  |  |  |  |  |  |  |  |  |  |  |
|  | 6 |  |  |  |  |  |  |  |  |  |  |  |
|  | 7 |  |  |  |  |  |  |  |  |  |  |  |
|  | 8 |  |  |  |  |  |  |  |  |  |  |  |
|  | 9 |  |  |  |  |  |  |  |  |  |  |  |
|  | 10 |  |  |  |  |  |  |  |  |  |  |  |
|  | 11 |  |  |  |  |  |  |  |  |  |  |  |
|  | 12 |  |  |  |  |  |  |  |  |  |  |  |
|  | 13 |  |  |  |  |  |  |  |  |  |  |  |
|  | 14 |  |  |  |  |  |  |  |  |  |  |  |
|  | 15 |  |  |  |  |  |  |  |  |  |  |  |
|  | 16 |  |  |  |  |  |  |  |  |  |  |  |
|  | 17 |  |  |  |  |  |  |  |  |  |  |  |
|  | 18 |  |  |  |  |  |  |  |  |  |  |  |
|  | 19 |  |  |  |  |  |  |  |  |  |  |  |
|  | 20 |  |  |  |  |  |  |  |  |  |  |  |

Average leakage start point
Comparative Example 1: 2.1 falls on average
Experimental Example 1: no leakage till 10 falls

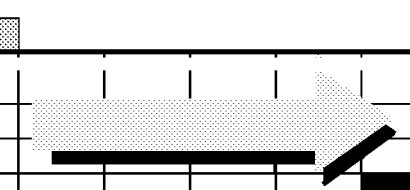

Pressure Experiment

Holes are formed at bottoms of the secondary battery samples, and nitrogen gas was injected through the holes to increase an inner pressure of the samples.

As a result of the experiment, leakage was found at the 20 samples of a secondary battery (a comparative example 2) having a serration only at the gasket until the CID is short-circuited, and leakage was found only at three samples when the CID was short-circuited, namely at a pressure of about 12 kgf/cm$^2$.

In case of 20 samples of a secondary battery (an experimental example 2) having serrations at both the gasket and the safety vent, leakage was not found though a pressure was increased to 16 kgf/cm$^2$ after the CID was short-circuited.

The results of experiment are depicted in the following table 2.

TABLE 2

| | Short-circuit pressure (kgf/cm$^2$) | Comparative example 2 (serration at gasket) | Experimental example 2 (serrations at both gasket and safety vent) |
| --- | --- | --- | --- |
| Leakage before short-circuit of CID | | 0/20 | 0/20 |
| Leakage at short-circuit of CID | 12 | 0/20 | 0/20 |
| Leakage after short-circuit of CID | 12-16 | 3/20 | 0/20 |
| Total leakage | | 3/20 | 0/20 |

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

| Reference Symbols | |
| --- | --- |
| 10: electrode assembly | 11: electrode plate |
| 12: separator | 13: first lead |
| 14: second insulation plate | 20: case |
| 30: cap assembly | 32: top cap |
| 34: PTC element | 40: gasket |
| 50, 60, 70, 80: leakage prevention portion | |

What is claimed is:

1. A secondary battery, comprising:
   an electrode assembly in which a cathode plate and an anode plate are arranged with a separator being interposed therebetween;
   a case in which the electrode assembly is received;
   a cap assembly capable of sealing an open end of the case;
   a gasket interposed between the case and the cap assembly; and
   a first leakage prevention portion comprising a protrusion part formed at a surface of the gasket and a counter protrusion part formed at a surface of the cap assembly and contacted with the protrusion part of the gasket, the counter protrusion part having a barb at the end thereof pierced into the gasket by clamping between the gasket and the cap assembly, such that the counter protrusion part is closely engaged with the protrusion part.

2. The secondary battery according to claim 1, wherein the cap assembly includes:
   a top cap configured to seal the open end of the case;
   a PTC (Positive Temperature Coefficient) element arranged in contact with the top cap; and
   a safety vent having an upper surface contacted with the PTC element and a lower surface contacted with the gasket, the counter protrusion part being formed at the lower surface of the safety vent, the safety vent being electrically connected to the electrode assembly.

3. The secondary battery according to claim 1, wherein the protrusion part and the counter protrusion part includes at least one protrusion of serration shape.

4. The secondary battery according to claim 3, wherein the serration shape has a triangular, rectangular, circular, quadrangular or round shape.

5. The secondary battery according to claim 2, wherein the safety vent is made of metallic material.

6. The secondary battery according to claim 1, further comprising a second leakage prevention portion formed at a surface of the cap assembly, which is opposite to the first leakage prevention portion and contacted with the gasket.

7. The secondary battery according to claim 1, further comprising a third leakage prevention portion formed at a surface of the cap assembly, which is contacted with the gasket.

8. The secondary battery according to claim 6, wherein the second leakage prevention portion has at least one protrusion of serration shape.

9. The secondary battery according to claim 7, wherein at least one of the leakage prevention portion and the third leakage prevention portion has at least one serration or protrusion.

* * * * *